Oct. 22, 1957  J. D. MARTINEZ  2,810,548
METHOD FOR ORIENTING CORES
Filed Nov. 27, 1953
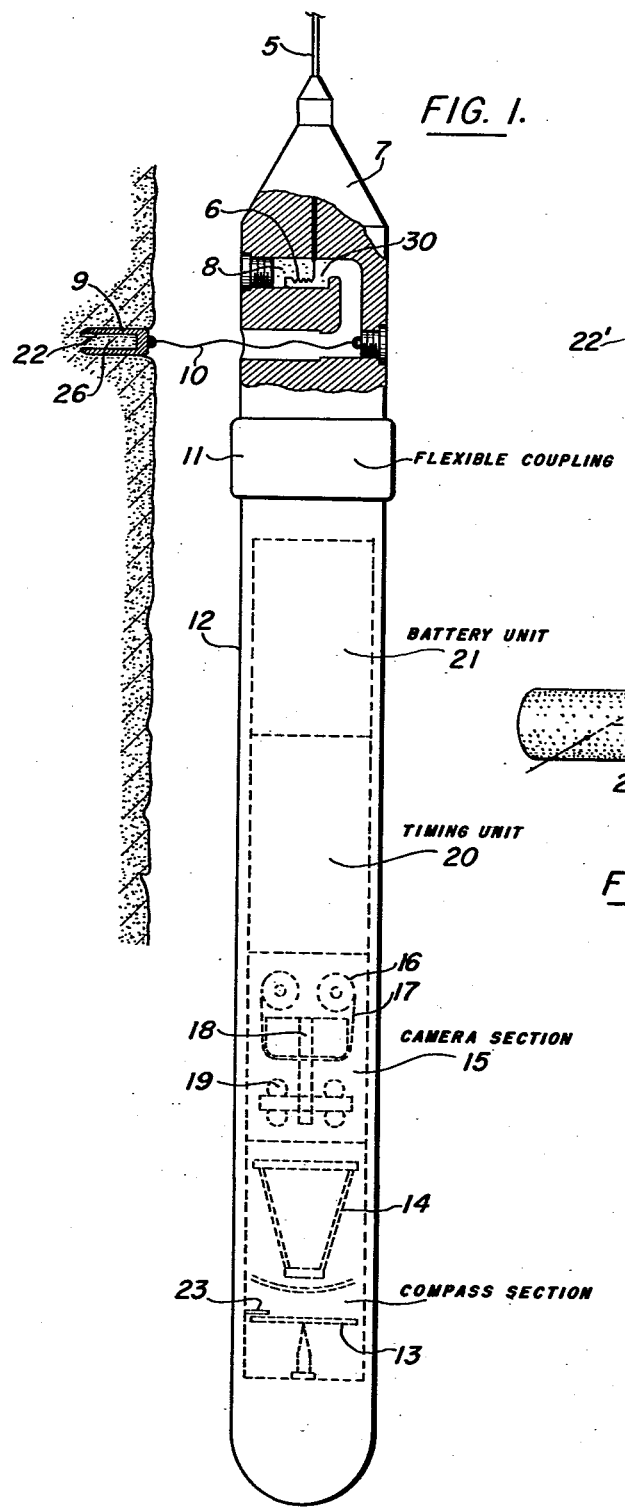
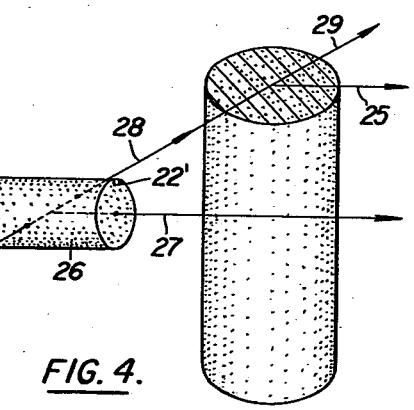
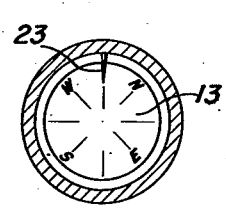
INVENTOR.
Joseph D. Martinez,
BY
ATTORNEY.

US United States Patent Office 2,810,548
Patented Oct. 22, 1957

2,810,548

METHOD FOR ORIENTING CORES

Joseph D. Martinez, Houston, Tex., assignor, by mesne assignments, to Esso Research and Engineering Company, Elizabeth, N. J., a corporation of Delaware Application November 27, 1953, Serial No. 394,589

2 Claims. (Cl. 255—1.4)

This invention relates to a method for determining the orientation of a conventional core from the known orientation of a side wall core which has been taken at the same depth from which the conventional core was taken.

In prospecting for oil deposits it is often desirable to ascertain the dip and strike of lithologic strata since valuable information as to oil-bearing strata can often be obtained thereby. This determination of the dip and strike is sometimes done by taking a core sample at the bottom of a drill hole. If stratification can be observed in the core and the inclination and direction of inclination of the borehole and the orientation of the core is known, dip and strike can be determined. One type of apparatus which has been used includes a magnetic compass and means for locking said magnetic compass when a conventional core is taken and brought up to the surface of the earth. The position of the locked compass indicates the north-south magnetic direction with respect to the conventional core. This method has proved unsatisfactory because when securing a conventional core it is practically impossible to predict just when the core or parts of the core become dislodged from the formation being cored. Furthermore, most conventional cores consist of a number of pieces rather than one continuous core. Quite often it is difficult to reconstruct the orginal core from these pieces. Another type apparatus which has been used marks the conventional core, and takes an inclination record of a borehole with the direction of inclination having a definite relationship to the mark on the conventional core. Such an instrument is shown by U. S. Patent No. 2,489,566, issued to Engle, November 29, 1949. However, this method requires a separate directional survey and cannot be used in a vertical borehole. Another method in general use for determining the orientation of a conventional core is to determine the direction of magnetic polarization of magnetic materials found in the conventional core. This determination of magnetic polarization is accomplished by means of an instrument for determining residual magnetism such as a remanent magnetometer. However, it is often the case that the direction of magnetic polarization thus determined is not the same direction as the direction of the present earth's magnetic field. This is believed to be so because the direction of the magnetic polarization of the conventional core is the same as the direction of the magnetic field of the earth at the time of deposition of the strata sampled. As is well known the earth's magnetic field varies with time. Hence any determination of the direction of magnetic polarization of the core will not necessarily determine the orientation of the core with respect to the present earth's magnetic field.

It is an object of this invention to provide an apparatus and method for orienting a side wall core.

It is a further object of this invention to provide a method of orienting a conventional core by correlating a physical property of a side wall core, the orientation of which is known, with the same physical property of the conventional core thereby determining the orientation of the conventional core.

It is a still further object of this invention to provide a method and apparatus for orienting a side wall core which method can be used in substantially vertical boreholes.

The foregoing objects are carried out by the provision of a means for taking a side wall core sample in conjunction with a means for measuring the direction of the sample so taken thereby orienting the side wall core. A conventional core is taken at the same depth as the side wall core. It is seen, therefore, that any physical property such as the direction of magnetic polarization has the same direction in both cores. Hence, if this physical property is compared with respect to the two cores and the orientation of the side wall core is known, the orientation of the conventional core can be determined. The direction of magnetic polarization of the side wall core and the conventional core is ascertained by means of an instrument at the surface such as a remanent magnetometer. Such an instrument is shown in U. S. Patent No. 2,634,317, issued to Marchand et al., April 7, 1953.

In the drawings:

Fig. 1 is a view partly in section and partly in elevation of a side wall core orientation apparatus such as can be utilized in the practice of my method;

Fig. 2 is a plan view of the compass used in the instrument shown in Fig. 1;

Fig. 3 shows a side wall core which is obtained and properly marked by the apparatus; and Fig. 4 shows a conventional core and a side wall core arranged adjacent one another and illustrating the manner in which the orientation of the conventional core is obtained.

Referring more specifically to the drawings, Fig. 1 shows an example of the type of apparatus which can be utilized in obtaining a side wall core.

Numeral 9 shows a means for sampling a core from the well bore. This is in the form of a projectile which is shot into the formation. A flexible metallic cable 10 connects the projectile 9 with the rest of the apparatus. Numeral 5 indicates an insulated conductor forming part of the cable which supports the apparatus and which is used for lowering it to the level of the bed to be sampled. This conductor passes through the body 7 of the apparatus and is connected to a filament 6. A chamber 30 within the body 7 contains an explosive charge 8 the deflagration of which expels the projectile 9 out of the body 7. Located within the hollow portion of the projectile 9 is a marking element 22. The function of the marking element 22 is to mark the upper portion of the side wall core sample 26 as shown in Fig. 3. Connected to the side wall coring means by a flexible coupling 11 is a surveying means. The surveying means is located within a housing 12 and consists of a battery unit 21, a timing mechanism 20, a camera section 15, an inclinometer 14, and a magnetic compass 13. The camera section 15 includes the usual film rolls 16, film 17, lens 18 and lights 19. In operation the inclinometer 14 and compass 13 are photographed on the film 17 to obtain the necessary record of inclination of the borehole and the direction of the side wall core. A timing mechanism is housed within section 20 which is connected above the camera section 15 while the batteries which furnish the source of current supply are mounted within the battery unit 21. All of these sections are connected to each other, usually by a threaded connection, and together form the entire surveying instrument. Also disposed within the lower portion of the surveying instrument and connected to the housing 12 just above the magnetic compass 13 is a lubber line 23. This lubber line 23 is in the same vertical plane as the projectile 9 and hence assumes the same azimuthal position with respect to the magnetic compass 13 as the position of the projectile 9.

It is to be understood that my method can be practised by any sort of side wall coring means and any type of inclination and direction measuring means. Though a percussion type side wall sample taker is shown in Fig. 1, another type of side wall sampler is a mechanical side wall sample taker and said mechanical side wall sample taker will serve equally well in practising my method of orienting a conventional well core. Also in place of the multiple shot photocompass equipment shown, any type of inclinometer may be utilized. In place of the magnetic compass member 13 a gyrocompass is equally usable. If a gyrocompass is used a circular azimuth scale would be substituted for the lubber line 23. The gyrocompass unit would have an indicator located adjacent said circular azimuth scale for the purpose of indicating the orientation of the side wall core. The side wall coring means and orientation means shown in Fig. 1 is for the purpose of illustration only and is not intended to limit the scope of my invention in any way.

In carrying out my new method of orienting a conventional core from the known orientation of a side wall core a conventional core to be oriented is taken out of the borehole. A side wall core is then taken out of the borehole at the same depth at which the conventional core was taken. When the side wall core is taken by means of electrically detonating the powder 8 located within the chamber 30 of the side wall coring instrument, marker 22 marks the side wall core as shown at 22' in Fig. 3. In order to properly locate the side wall core sample within the earth it is necessary to know not only its orientation with respect to geographical north but also its uppermost location within the borehole. The orientation of the side wall core 26 is photographically taken by means of the surveying means as previously explained and the mark 22' locates the top of the side wall core. If the strata within the side wall core 26 are easily seen it might be possible to determine the dip and strike of said strata directly by means of the orientation of the side wall core. However, usually the side wall core is much too small and the strata not identifiable enough to permit the orientation of the strata directly from the side wall core. It is impossible to take a larger sample of the side wall core because of the restrictions imposed by the diameter of the borehole. The use of the side wall cores, being only 2" in length and ¾" in diameter, has been limited to giving cuts, odors and for visual examination permitting the confirmation of interesting zones. They can also be used in favorable cases for the usual porosity, permeability and other analysis. I am the first to use a side wall core for the purpose of orientating a conventional core. After taking a side wall core and marking said core, the direction of magnetic polarization of both said cores is determined at the surface. The determination of magnetic polarization may be accomplished by means of any instrument utilized for such a purpose, an example of such an instrument being shown in U. S. Patent No. 2,634,317. After the direction of magnetic polarization is determined in both cores, they may be marked in some manner to indicate said direction. Then the lines so marked are compared by placing said two cores adjacent to one another and arranging the magnetic polarization lines in parallel as illustrated in Fig. 4. In Fig. 4 line 25 indicates the direction of magnetic polarization of the conventional core and line 27 on side wall core 26 indicates the direction of magnetic polarization of the side wall core. Line 28 on the side wall core indicates the direction of the earth's present magnetic field as indicated by means of the surveying instrument which is lowered into the borehole. The two cores then may be compared. Line 29 which forms the same angle with line 25 that line 28 forms with line 27, locates the direction of the earth's magnetic field on the conventional core.

In operation, when a conventional core which is received at the top of the borehole clearly shows strata which are easily seen and hence is capable of having its dip and strike determined, a side wall core is taken at the same depth. At the surface the magnetic polarization of both the cores is determined. The polarizations so determined are compared and from the known orientation of the side wall core the orientation of the conventional core is ascertained.

While I have described a specific embodiment of my invention it will be apparent to skilled workers that many variations may be made in this embodiment without departing from the scope of the appended claims.

Having fully described and illustrated my invention what I desire to secure and claim by Letters Patent is:

1. A method of orienting a conventionally drilled core for obtaining dip and strike information comprising taking said core by conventional coring apparatus, lowering a side wall coring apparatus in the borehole to substantially the same depth from which the first mentioned core was taken, recording the azimuthal direction of a core sampling tube within said side wall coring apparatus, projecting said core sampling tube into the wall of the well bore to obtain a side wall core and marking said side wall core to indicate the top portion thereof, withdrawing said side wall coring apparatus from the borehole, removing said core from the side wall core sampling tube, measuring the direction of magnetic polarization of each of said cores, orienting said side wall core in space with reference to said mark and the recorded azimuthal direction and aligning the cores with respect to their measured direction of magnetic polarization, whereby said first mentioned core is oriented as when taken.

2. The method of orienting a bottom hole core for obtaining dip and strike information comprising taking said core by bottom hole coring apparatus, lowering a side wall coring apparatus in the borehole to substantially the same depth from which the first mentioned core was taken, recording the azimuthal position of a core sampling tube within said side wall coring apparatus, projecting said core sampling tube into the wall of the well bore to obtain a side wall core, withdrawing said side wall coring apparatus from the borehole, removing said core from the side wall core sampling tube, measuring the direction of magnetic polarization of each of said cores, orienting said side wall core in space by reference to the recorded position of the core sampling tube and by reference to the position of the core within the core sampling tube, and aligning the cores with respect to their measured direction of magnetic polarization, whereby said first mentioned core is oriented as when taken.

References Cited in the file of this patent

UNITED STATES PATENTS

| | | |
|---|---|---|
| 2,141,828 | Schlumberger | Dec. 27, 1938 |
| 2,210,464 | O'Leary | Aug. 6, 1940 |
| 2,489,566 | Engle | Nov. 29, 1949 |
| 2,628,816 | Mahan | Feb. 17, 1953 |
| 2,634,317 | Marchand et al. | Apr. 7, 1953 |